(12) United States Patent
Ewert

(10) Patent No.: US 11,206,094 B2
(45) Date of Patent: Dec. 21, 2021

(54) SYNCHRONIZATION OF COMPONENTS BY A CONTROL UNIT

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 16/742,313

(22) Filed: Jan. 14, 2020

(65) Prior Publication Data

US 2020/0228219 A1 Jul. 16, 2020

(30) Foreign Application Priority Data

Jan. 16, 2019 (DE) .................. 102019200437.7

(51) Int. Cl.
*H04J 3/06* (2006.01)
*H04L 29/08* (2006.01)

(52) U.S. Cl.
CPC ............ *H04J 3/0664* (2013.01); *H04L 67/12* (2013.01)

(58) Field of Classification Search
CPC ............................... H04J 3/0664; H04L 67/12
See application file for complete search history.

(56) References Cited

U.S. PATENT DOCUMENTS

| 8,675,665 B2* | 3/2014 | Umayabashi ......... H04J 3/0632 370/395.62 |
| 2005/0180466 A1 | 8/2005 | Franchuk et al. |
| 2013/0039359 A1 | 2/2013 | Bedrosian |
| 2013/0346419 A1* | 12/2013 | Hewitt ................ G06F 16/2458 707/746 |

FOREIGN PATENT DOCUMENTS

| EP | 2469765 A1 | 6/2012 |
| EP | 2544388 A1 | 1/2013 |

\* cited by examiner

*Primary Examiner* — Samina F Choudhry
(74) *Attorney, Agent, or Firm* — Norton Rose Fulbright US LLP; Gerard Messina

(57) ABSTRACT

A method is described for providing a universal time in a control unit. The universal time is generated by a timer of the control unit or is received via a communication link from at least one external unit, the universal time being transmitted directly or as at least two time stamps to at least one component for ascertaining time deviations. Furthermore, a control unit, a computer program and a machine-readable storage medium are also described.

13 Claims, 1 Drawing Sheet

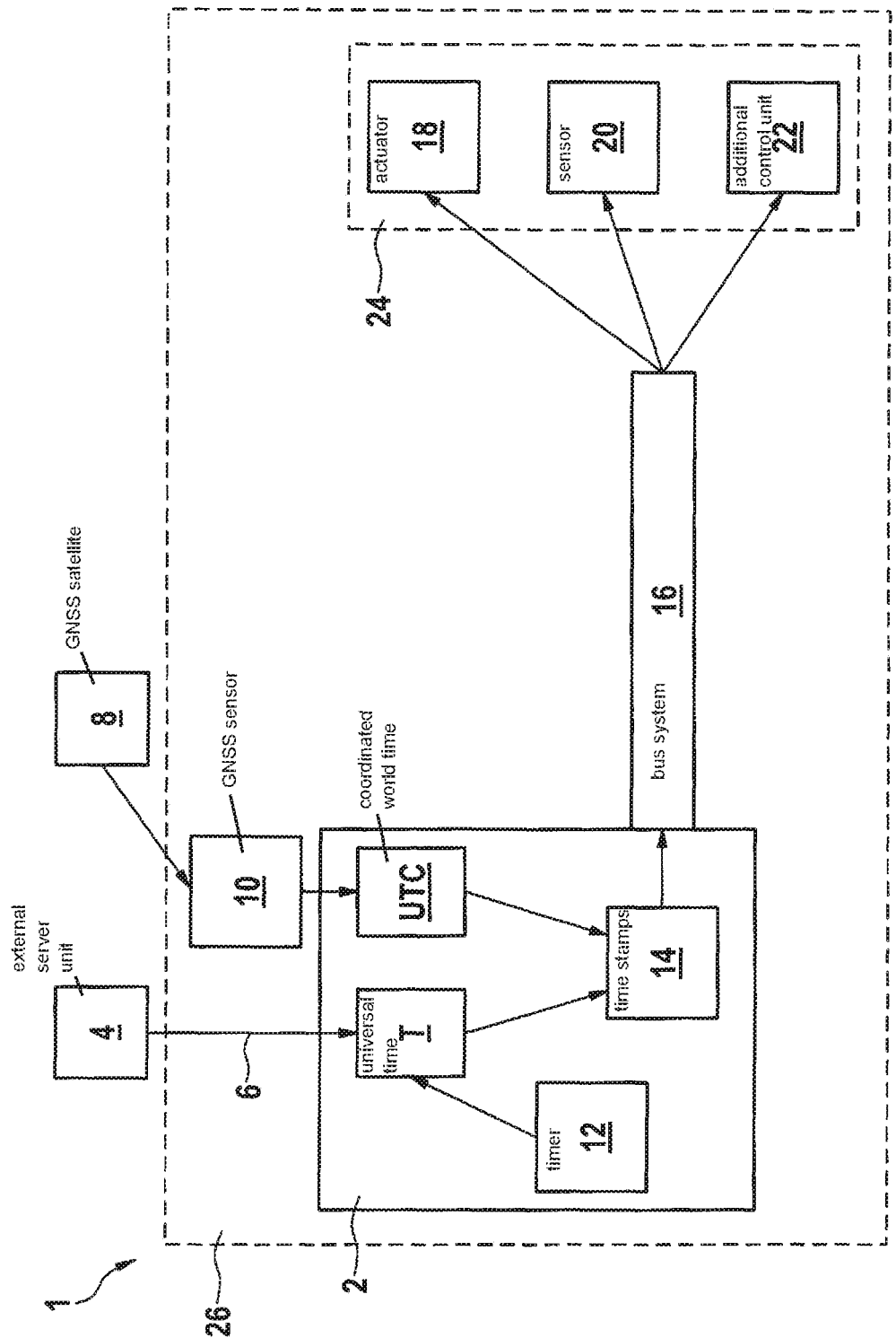

SYNCHRONIZATION OF COMPONENTS BY A CONTROL UNIT

CROSS REFERENCE

The present application claims the benefit under 35 U.S.C. § 119 of German Patent Application No. DE 102019200437.7 filed on Jan. 16, 2019, which is expressly incorporated herein by reference in its entirety.

FIELD

The present invention relates to a method for providing a universal time in a control unit, to a control unit, to a computer program as well as to a machine-readable storage medium.

BACKGROUND INFORMATION

Some vehicles having automated driving functions, starting from a specific degree of automation, are able to be operated autonomously and without a driver.

Such vehicles are able for example to follow a course of the road automatically, to recognize other road users or obstacles automatically and to calculate the appropriate control commands in the vehicle as well as to transmit the control commands to actuators in the vehicle, whereby the course of travel of the vehicle is influenced correctly. In a fully automated vehicle, the driver is not involved in the driving process.

Vehicles of this type have plurality of control units, actuators and sensors, which perform various tasks during the operation of the vehicle. Usually, separate clocks and oscillators are installed in the various components, which act independently of one another. Due to the independent functioning of the clocks or oscillators, it is possible for differences to arise in the time basis of the components. The performance of safety-critical tasks and the transmission of safety-critical information within the vehicle, however, must occur in a precise manner in terms of time.

SUMMARY

An object of the present invention includes providing a method and a control unit for avoiding errors, which result from the different time bases of the components.

This object may be achieved in accordance with example embodiments of the present invention. Advantageous developments of the present invention are described herein.

According to one aspect of the present invention, an example method is provided, by which a universal time is provided in a control unit.

In one step, the universal time is generated by a timer of the control unit or is received via a communication link from at least one external unit. The control unit may preferably be a control unit internal to the vehicle. The universal time may be a time across vehicles or a time internal to the vehicle.

The universal time is subsequently transmitted directly or as at least two time stamps to at least one component for ascertaining time deviations.

It is thus possible to transmit the universal time directly or in the form of a continuous data flow to the components in order to form a precise time basis. Alternatively or additionally, it is possible to provide the universal time in discrete form as time stamps, which the control unit is able to transmit to the components at defined time intervals.

In particular, it is possible to use the universal time for an error analysis or error detection in order to check or correct the time basis of the respective components. The universal time may be used for example for a highly accurate measurement of time-related processes such as for example oscillator clock pulses, controlling and performing tasks, reaction times and the like. The measurements performed in precise fashion in terms of time may be compared to setpoint values and, if necessary, adapted or corrected. The performance of the comparison and the request for correction may occur inside the component or by the control unit.

According to another aspect of the present invention, an example control unit is provided, the control unit being designed to perform all steps of the method according to the present invention.

Furthermore, according to one aspect of the present invention, an example computer program is provided, which comprises instructions, which, when the computer program is executed by a computer or a control unit, prompt the latter to perform the method of the present invention.

According to another aspect of the present invention, an example machine-readable storage medium is provided, on which the computer program of the present invention is stored.

The control unit may be installed in a vehicle for example and connected in data=conducting fashion to a vehicle bus or bus system. The vehicle may be designed to be able to be operated in automated and/or partially automated fashion. In particular, the vehicle may be operable in accordance with the SAE J3016 standard in partially automated, conditionally automated, highly automated and/or fully automated or driverless fashion.

The method and the control unit make it possible to provide a global time or universal time for the components of the vehicle. The components may be actuators for example, control units, sensors and the like. This makes it possible for the input data and the output data of the components to obtain a standardized time basis. This is advantageous particularly in the transmission of time-critical information within the vehicle, since here the age of the data is known with high accuracy relative to a standardized time basis. Furthermore, it is also possible to continue to use the standardized time basis internally within the components for various purposes.

The method and the control unit offer in particular the following advantages:

On the basis of the universal time, it is possible to allow for a highly accurate monitoring of components and of the tasks performed by the components.

It is possible to ascertain delays and errors in the components.

Due to differences in time, deviations between components may be detected and avoided.

Safety-critical and/or time-critical tasks may be performed with precision and in a standardized way.

According to one specific embodiment of the present invention, the universal time and/or the at least two time stamps are transmitted by the control unit to a bus system. The bus system may be developed for example as a CAN bus, an Ethernet bus and the like. This makes it possible to make the universal time or the global time available within the vehicle.

The universal time may be provided to all connected components for example in the form of a time master. Control units, sensors and/or actuators may be regarded as components. Within these components, the universal time is received and is used with a defined delay as time stamp, for example for the output data. The delay may arise due to the signal propagation times through the bus system and may be taken into account equally in all components.

Such a synchronization to the universal time within the vehicle may also be referred to as a so-called global time sync (GTS).

According to another specific embodiment of the present invention, at least one component is connected to the control unit via the bus system, at least one task performed by the component being synchronized on the basis of the universal time and/or the at least two time stamps. Alternatively or in addition to the synchronization, it is possible to perform a correction of the internal clock frequencies or a complete provision of the time parameters via the bus system.

The respective tasks of a software in a vehicle sensor, a vehicle control unit or a vehicle actuator are normally implemented at different speeds. In practice, in particular a so-called 10 ms task may be provided for certain calculations within the software of a vehicle component. Such tasks, which normally run on a microcontroller, may be monitored by a "watchdog" or a monitor with respect to an execution time.

In case of a very high capacity utilization of the respective microcontroller, such tasks cannot be processed with the specified time of 10 ms. This produces a delay in the execution of the respective task. The method is able to detect such a delay by comparing the clock frequencies inside the component or execution times with the clock frequencies or execution times provided via the bus system.

It is thus possible to detect and output an error within the component. The method makes it possible to monitor a time delay within a task not as hitherto via an oscillator inside the component, but rather with the aid of the universal time received and processed in a highly accurate manner. On the basis of at least two received time stamps of the highly accurate universal time, it is possible to synchronize the component to this time internally.

It is also possible for example to synchronize an existing oscillator clock pulse to the global time. Subsequently, this synchronized clock pulse may be used within the component in order to detect a time delay within the task monitor in highly accurate fashion.

According to another exemplary embodiment of the present invention, an oscillator frequency between the at least two time stamps is ascertained and is compared to a setpoint frequency. It is thus possible to use the provided time stamps or points in time to perform a precise check of an oscillator frequency or an oscillator clock pulse. This makes it possible to ascertain an oscillator drift or an oscillator error within the utilized components.

For this purpose, it is possible to receive the at least two highly accurate time stamps of the universal time and to ascertain the oscillator clock pulses between these two time stamps by taking into account a known jitter or the usual variance. If an oscillator clock pulse deviates fundamentally from the set fundamental frequency, an error is detected. The detected error may be stored in an error memory or may be output to an interface.

According to another exemplary embodiment of the present invention, a deviation of the oscillator frequency from a setpoint frequency is performed several times before an error and/or a message is generated. This makes it possible to perform multiple measurements of the oscillator clock pulses between two different time stamps before an error is output. In particular, a message may be communicated with the measured oscillator clock pulses before an error is determined and output.

According to another exemplary embodiment, a clock internal to a component is adapted to the universal time and/or the at least two time stamps. For this purpose, the universal time provided by the control unit may be used to check the clocks. Based on a deviation of a frequency of the checked clocks within a defined measuring interval, an adjustment of the checked clocks may be performed in accordance with a setpoint clock pulse.

According to another exemplary embodiment, at least a start and/or a control process of a task and/or component are performed by the clock adapted to the universal time. With the aid of the universal time, after synchronization within the component, it is also possible for example to start or control specific tasks within software portions or hardware sections with the aid of this highly accurate time. For example, a 10 ms task may be started cyclically via a trigger on the basis of the universal time or a synchronized oscillator clock pulse. In an analogous manner, the further tasks of the hardware and/or software may also be started synchronously and cyclically on the calculation unit of the component with the aid of the highly accurate universal time.

According to another specific embodiment, the control unit receives a coordinated world time. The coordinated world time or the so-called UTC may be received by a GNSS sensor or receiver from GNSS satellites. The coordinated world time may hereby be used in addition to the provided universal time in order to control the tasks precisely. In particular, the coordinated world time may be combined with the universal time.

Such a combination of the universal time with a UTC offers the advantage of making it possible for certain time-critical tasks to be able to run in synchronized fashion across components and also across vehicles. For example, with the aid of the universal time, a 10 ms task may be executed synchronously on all components of a vehicle.

The results of the calculations of the individual components may subsequently be provided or transmitted through the bus system in time-synchronous fashion and also be provided outside of the vehicle.

According to another specific embodiment of the present invention, the coordinated world time is used for checking the universal time. Due to the redundant provision of the times, it is possible to perform a mutual check with respect to deviations. This makes it possible for the automated driving or the data processing within vehicles to be performed in even more synchronized fashion and thus more efficiently even in the case of different components. The method makes it possible to support safety-critical data, tasks or time-critical calculations using a redundant and precise time basis.

According to another specific embodiment of the present invention, a median or an average value is formed from the coordinated world time and the universal time. This makes it possible to provide a higher precision of the time basis provided by the control unit for the components and/or tasks.

Thus, not only the universal time is used, but also a UTC received by a GNSS sensor. For example, the UTC received with high accuracy may be used to detect errors within the universal time and to compensate for these. Furthermore, it is possible to perform a synchronization within the component both with the aid of the universal time as well as simultaneously with the aid of the UTC. The UTC may be used as the basis for the universal time on a time master.

The components connected to the bus system may first be synchronized to the universal time and in parallel to the UTC. Subsequently, an average value or median value over time may be formed from both synchronizations, which results in an even more accurate synchronization of the time within the components.

Since in vehicles an optimal GNSS reception is not always ensured, in a tunnel for example, it is possible to use solely the universal time as a time basis in such situations.

According to another specific embodiment of the present invention, the universal time and/or the coordinated world time are received from a server unit through the communication link of the control unit. The control unit may thus be used as a receiver for a universal time provided externally in the server unit. The external server unit may be designed as a cloud for example.

For implementing the method, the universal time may be transmitted from the cloud via a communication link to the control unit. Alternatively or additionally, the universal time may be transmitted in the form of time stamps of the communication link between the server unit and the control unit and be used by the control unit.

The communication link may be implemented for example as a car-to-car communication link or as a car-to-infrastructure communication link.

The synchronization of the vehicle components may be performed with the aid of at least two received messages or data packets. The messages are received by the control unit directly or indirectly via a receiver unit and are transmitted to the further components via the bus system.

A set-up of this type including a plurality of vehicles, which have at least one control unit, also allows for the synchronization of vehicle components across the respective vehicles.

A preferred exemplary embodiment of the present invention is explained in more detail below with reference to a highly simplified schematic representation.

BRIEF DESCRIPTION OF THE DRAWING

FIG. 1 shows a schematic flow chart of a method for providing a universal time in accordance with an example embodiment of the present invention.

DETAILED DESCRIPTION OF EXAMPLE EMBODIMENTS

FIG. 1 shows a schematic flow chart of a method 1 for providing a universal time T in a control unit 2. Method 1 is implemented by control unit 2.

Universal time T is provided by an external server unit 4 and is received by control unit 2 via a communication link 6. According to the exemplary embodiment, external server unit 4 is developed as a cloud.

In parallel to universal time T, a coordinated world time UTC is received from at least one GNSS satellite 8 by a GNSS sensor 10 and is likewise used for implementing method 1.

Alternatively or additionally, universal time T may be generated by a timer 12 of control unit 2. Timer 12 may be a highly precise oscillator for example.

Based on universal time T, t least two time stamps 14 are produced and used for ascertaining time deviations. The received coordinated world time UTC may likewise be used to produce time stamps.

The respectively produced time stamps may subsequently be transmitted to a bus system 16, which is connected to control unit 2.

According to the exemplary embodiment, bus system 16 is an Ethernet bus and is connected in data-conducting fashion to several components 18, 20, 22.

Components 18, 20, 22 may be for example an actuator 18, a sensor 20 and an additional control unit 22, which are able to execute tasks controlled in a precise manner in terms of time.

The generated time stamps are provided to components 18, 20, 22 via bus system 16 in order to perform a synchronization 24.

Control unit 2, GNSS sensor 10, bus system 16 and components 18, 20, 22 may be situated in a vehicle 26. Communication link 6 between server unit 4 and control unit 2 may be a car-to-car or car-to-infrastructure communication link (car-to-X) 6.

What is claimed is:

1. A method for time synchronization, the method comprising the following steps:
   a processor obtaining over time, from a local timer of the processor or via a communication link from at least one external unit, a plurality of values of a universal time;
   the processor transmitting two of the values of the universal time or two respective time stamps corresponding to the two of the values to a component;
   the component obtaining clock pulses of a local oscillator of the component between receipt by the component of the two of the values of the universal time or of the two respective time stamps;
   the component ascertaining an oscillator frequency of the local oscillator based on the obtained clock pulses;
   the component comparing the ascertained oscillator frequency to a setpoint frequency predefined for the two of the values of the universal time;
   the component identifying a time deviation based on a discrepancy, indicated by a result of the comparing, between the ascertained oscillator frequency and the setpoint frequency; and
   based on the identified time deviation, the component performing time corrections.

2. The method as recited in claim 1, wherein the transmission is via a bus system.

3. The method as recited in claim 2, wherein the component is connected to the processor via the bus system, at least one task performed by the component being synchronized with other components based on the time corrections.

4. The method as recited in claim 1, wherein the deviation from the setpoint frequency is determined multiple times before the time corrections are performed based on the deviation.

5. The method as recited in claim 1, wherein the time corrections are performed by adapting a component-internal clock to the universal time.

6. The method as recited in claim 5, wherein at least a start and/or a control process of a task and/or a component are performed by the clock adapted to the universal time.

7. The method as recited in claim 6, wherein a coordinated world time is received by the processor.

8. The method as recited in claim 7, wherein the coordinated world time is used for checking the universal time.

9. The method as recited in claim 8, wherein the processor obtains a median or an average value from a combination of the coordinated world time and the universal time, obtains the time stamps based on the obtained median or average value, and transmits the time stamps to the component.

10. The method as recited in claim 1, wherein the universal time is received from a server unit via the communication link of the processor.

11. The method as recited in claim 8, wherein the universal time and/or the coordinated world time are received from a server unit via the communication link of the processor.

12. A system comprising:
a component; and
a control unit that includes processor;
wherein:
the processor is configured to:
obtain over time, from a local timer of the control unit or via a communication link from at least one external unit, a plurality of values of a universal time; and
transmit two of the values of the universal time or two respective time stamps corresponding to the two of the values to the component; and
the component is configured to:
obtain clock pulses of a local oscillator of the component between receipt by the component of the two of the values of the universal time or of the two respective time stamps;
ascertain an oscillator frequency of the local oscillator based on the obtained clock pulses;
compare the ascertained oscillator frequency to a setpoint frequency predefined for the two of the values of the universal time;
identify a time deviation based on a discrepancy, indicated by a result of the comparison, between the ascertained oscillator frequency and the setpoint frequency; and
based on the identified time deviation, perform time corrections.

13. Non-transitory machine-readable storage mediums on which are stored computer programs for time synchronization, the computer programs, when executed by a system, causing the system to perform a method, the method comprising:
a processor obtaining over time, from a local timer of the processor or via a communication link from at least one external unit, a plurality of values of a universal time;
the processor transmitting two of the values of the universal time or two respective time stamps corresponding to the two of the values to a component;
the component obtaining clock pulses of a local oscillator of the component between receipt by the component of the two of the values of the universal time or of the two respective time stamps;
the component ascertaining an oscillator frequency of the local oscillator based on the obtained clock pulses;
the component comparing the ascertained oscillator frequency to a setpoint frequency predefined for the two of the values of the universal time;
the component identifying a time deviation based on a discrepancy, indicated by a result of the comparing, between the ascertained oscillator frequency and the setpoint frequency; and
based on the identified time deviation, the component performing time corrections.

\* \* \* \* \*